United States Patent [19]

Denisar

[11] Patent Number: 5,387,025

[45] Date of Patent: Feb. 7, 1995

[54] BICYCLE SEAT

[76] Inventor: Richard A. Denisar, 20 Dans Rd., Browns Mills, N.J. 08015

[21] Appl. No.: 719,694

[22] Filed: Jun. 25, 1991

Related U.S. Application Data

[63] Continuation-in-part of Ser. No. 543,026, Jun. 25, 1990, abandoned.

[51] Int. Cl.$^6$ .............................................. B62J 1/06
[52] U.S. Cl. ................................... 297/209; 297/201
[58] Field of Search .............. 297/201, 195, 207, 312, 297/305, 349, 208, 205, 195.1, 209, 344.21, 344.18; 248/404, 405; 267/175, 177; 403/235, 236, 258, 260, 233

[56] References Cited

U.S. PATENT DOCUMENTS

| | | | |
|---|---|---|---|
| 1,120,379 | 12/1914 | Epley | 297/311 |
| 4,150,851 | 4/1979 | Cienfuegos | 297/195 |
| 4,387,925 | 6/1983 | Barker et al. | 297/195 |
| 4,877,286 | 10/1989 | Hobson et la. | 297/195 |

*Primary Examiner*—Kenneth J. Dorner
*Assistant Examiner*—Milton Nelson, Jr.
*Attorney, Agent, or Firm*—Simpson & Simpson

[57] ABSTRACT

A seat, as may be used on a bicycle, providing improved efficiency and comfort for a rider. The seat comprises a split seat having two halves simultaneously rotatable about the longitudinal axis of a mounting post. The points of the two halves that are furthest from the mounting post are also movable up or down in conjunction with the up and down movements of the rider's legs. In addition, support portions of each half are pivotable about the longitudinal axis of the axle on which the support portions are mounted. A seat configured in this manner will rotate about the longitudinal axis of the mounting post, thus causing the right and left sides of the axle on which the support portions sit to move equal distances in opposite directions of each other, i.e., when the left side is forward, the right side will be rearward by an equal distance. The seat needs no horn and can be manufactured using easily interchangeable parts so that a rider can select those parts that will provide the desired movement, support, or look that the rider desires.

3 Claims, 6 Drawing Sheets

BICYCLE SEAT

This is a continuation-in-part of co-pending application Ser. No. 07/543,026 filed on Jun. 25, 1990, now abandoned.

TECHNICAL FIELD

The present invention relates to saddles or seats used for supporting an operator of a foot or leg powered device such as a bicycle, tricycle or exercise machine.

BACKGROUND OF THE INVENTION

Cycling is a beneficial and rewarding experience for many. Bicycles provide recreation, exercise, and a means for transportation, among other uses.

Conventional seats that are presently used on most bicycles are of a one-piece design, and include a wider portion on which to sit, and a narrow "horn" portion. The horn is situated towards the front of the seat and allows a rider's leg to move down past the seat to make pedaling more comfortable.

One problem with conventional bicycle seats is that they do not provide adequate comfort for the rider. The conventional seat supports the operator's weight inefficiently, and permits a great deal of friction between the seat and the rider's legs. This causes discomfort to the rider and limits the amount of time that a bike can be ridden to the amount of time that the rider can endure the discomfort. There are those who find it uncomfortable to sit on a cycle seat for any period of time, especially elderly people, larger people, and those who suffer from medical conditions such as hemorrhoids.

Conventional seats are designed to allow the legs to slide down past and alongside the seat. This requires that the horn of the seat be small to allow passage of the legs. However, the seat also must support the person riding the bike, and therefore the support portion of the seat is larger than the horn and must be located such that the rider's buttocks and upper thighs rest thereon. Larger seats have been designed to offer more support to the rider, but they also restrict the movement of the rider, causing a greater amount of friction and therefore discomfort.

Attempts at solving the above-mentioned problems with conventional bicycle seats have been made. Seats having two halves, or split seats, have been made in a variety of designs including some that are adjustable in width, some with or without horns, and some that allow each half to go up or down as the rider's legs go up and down. Further, seats have been designed that mechanically cause one half of the split seat to rise while the other half is forced down by the rider's pedaling motion, such as that disclosed in U.S. Pat. No. 4,541,668 to Ruow. Other designers have taken great care to design seat halves that will more evenly support a rider's weight, such as that disclosed in U.S. Pat. No. 4,387,925 to Barker et al.

Seats have also been designed with horns specifically modified to reduce friction between the user's leg and the horn of the seat, such as that disclosed in U.S. Pat. No. 4,512,608 to Erani.

While all of these seats improve, to some extent, the comfort afforded the user, no seat has been designed that satisfactorily meets all of the needs of the user related to bicycle seat comfort. Conventional seats are totally unacceptable to some and are reluctantly accepted by others. Split seats without horns are a definite improvement, but none have been designed that fully satisfy the needs of a bicyclist for a comfortable and effective seat.

SUMMARY OF THE INVENTION

It is an object of the present invention to provide an improved vehicle seat that reduces the friction between the rider and the seat during riding.

Another object of the present invention is to provide an improved vehicle seat that is moveable in three different directions during a pedaling cycle to reduce the friction between the rider and the seat.

Disclosed is a seat, as may be used on a bicycle, providing improved efficiency and comfort for a rider. The seat comprises a split seat having two halves simultaneously rotatable about the longitudinal axis of a mounting post. The points of the two halves that are furthest from the mounting post are also movable up or down in conjunction with the up and down movements of the rider's legs. In addition, support portions of each half are pivotable about the longitudinal axis of the axle on which the support portions are mounted. The seat needs no horn and can be manufactured using easily interchangeable parts so that a rider can select those parts that will provide the desired movement, support, or look that the rider desires.

Other aspects and advantages of this invention will be apparent to those skilled in the art from the following descriptions, drawings and appended claims.

DESCRIPTION OF THE PREFERRED EMBODIMENTS

A first embodiment of the present invention is disclosed with reference to FIGS. 1A, 1B, 2A, 2B and 3–5.

Figures 1A, 2A, 3:
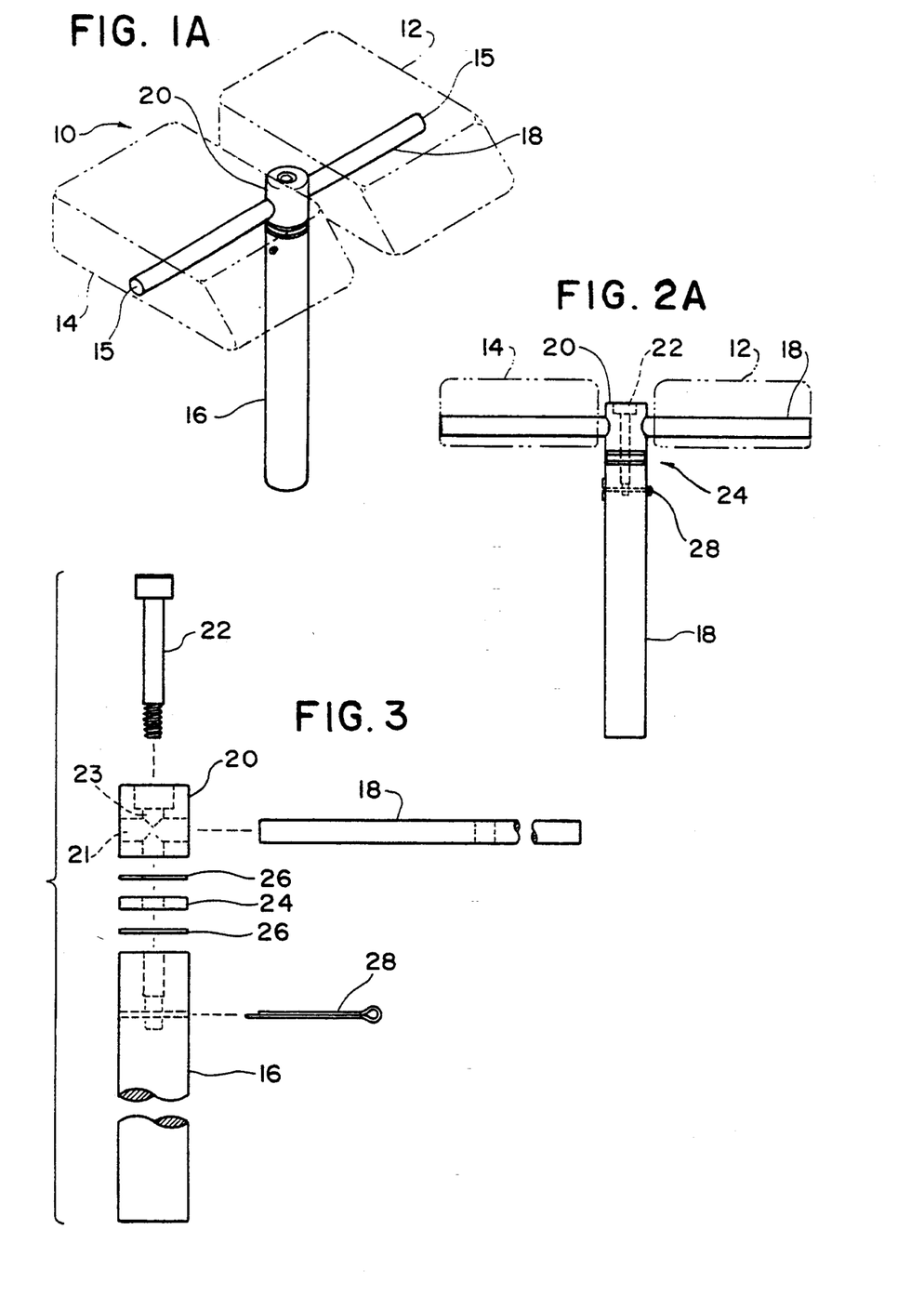
FIG. 1A a perspective view of a first embodiment of a seat according to the present invention.
FIG. 2A is a front view of the embodiment of FIG. 1A.
FIG. 3 is an exploded view of the embodiment of FIGS. 1A and 2A.
Figure 1B:
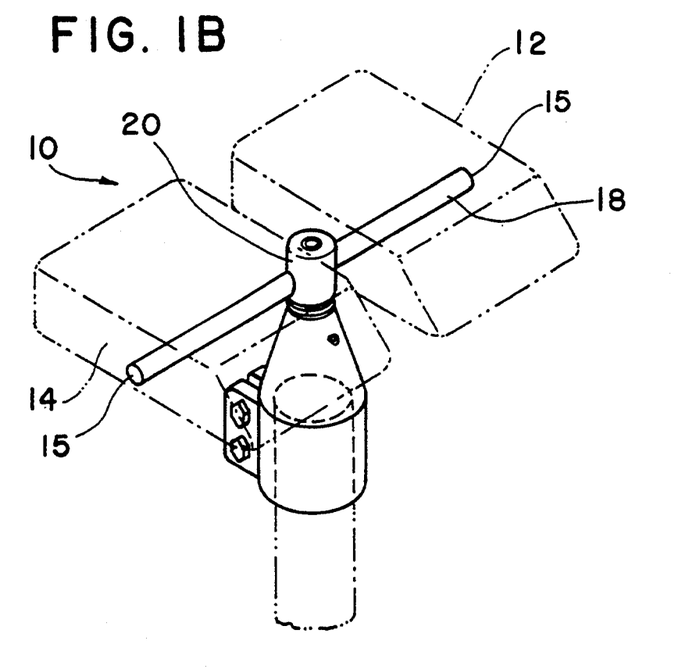
FIG. 1B is a perspective view of a variation to the embodiment of FIG. 1.
Figure 2B:
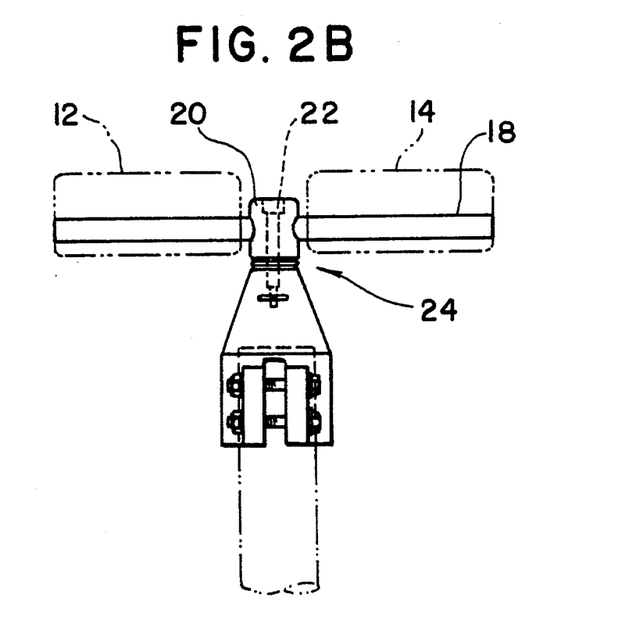
FIG. 2B is a front view of the variation shown in FIG. 1B.

FIG. 1A is a perspective view of a first embodiment of the present invention. FIG. 2A is a front view of the embodiment of FIG. 1A, and FIG. 3 is an exploded view of the embodiment of FIG. 1A and 2A without the support portions.

Referring to FIGS. 1A–3, a bicycle seat assembly 10 comprises left and right support portions 12 and 14, which are identical to each other. Support portions 12 and 14 can be shaped to generally conform to the contour of the buttocks and upper thigh of a human. A mounting means 16 is used to mount the seat assembly to the bicycle or other device. Mounting means 16 can comprise, for example, a post that is insertable into a mounting post receiving portion (not shown) of the bicycle or other device on which it will be mounted, as shown in FIGS. 1A and 2A. Alternatively, mounting means 16 can comprise a clamping portion attachable to the existing seat post of the bicycle as shown in FIGS. 1B and 2B. As shown in FIGS. 1B and 2B, mounting means 16 can be made of a flexible material which is larger than the standard seat post 17 of a bicycle (shown in phantom lines). Mounting means 16 can include a seat post receiving portion 19 into which the seat post 17 is insertable. The mounting means 16 is then clamped to seat post 17 using any known clamping means, for example, nut and bolt combination 5.

A axle 18 is passed through a post cap 20 via axle mounting hole 21 and is fixedly attached thereto utilizing a post cap mounting bolt 22 or other suitable fastening means. Support portions 12 and 14 are attached to axle 18, as described below with reference to FIGS. 4 and 5, so that they can pivot about the longitudinal axis of axle 18.

As seen in FIGS. 1A–3, post cap mounting bolt 22 passes through the end of post cap 20 and through axle 18 and is threaded into mounting means 16. A bearing 24 and washers 26 can be situated between mounting means 16 and post cap 20 to provide smoother rotation of the post cap; they are, however, not necessary. The post cap 20 may be directly mounted to the mounting means 16. By loosely attaching the post cap 20 and axle 18 to mounting means 16, with or without bearing 24 and washers 26 therebetween, post cap 20 and therefore axle 18 and support portions 12 and 14 are rotatable, as an assembly, about the longitudinal axis of mounting means 16. Cotter pin 28 secures bolt 22 to prohibit unwanted rotation of bolt 22.

Figure 4:
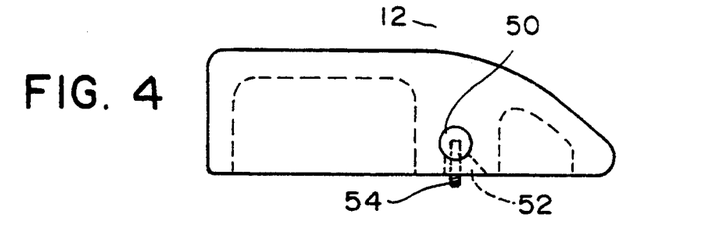
FIG. 4 is a side view of a first embodiment of a support portion of a seat according to the present invention.
Figure 5:
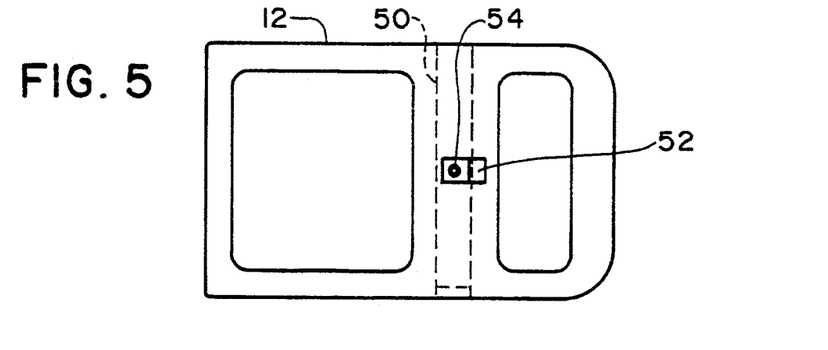
FIG. 5 is a bottom view of the support portion of FIG. 4.

FIGS. 4 and 5 are a side view and bottom view, respectively, of a preferred first embodiment of support portion 12 of FIGS. 1A and 2A. Preferably, the rear portion of support portion 12 is heavier than the front portion. This unequal weight distribution urges the support portion to a position with the set screw 54 resting against the rear face of slot 52 when the support portion is not under load. Support portion 14 is a "mirror image" of support portion 12, and therefore the description of support portion 12 applies equally to support portion 14.

Pivot bar 18 is insertable into axle receiving portion 50 of support portion 12. A slot 52 in support portion 12 allows insertion of a screw 54 (for example, a set screw) into a threaded hole in axle 18 so that support portion 12 is attached to axle 18 but can still pivot thereon. The length of slot 52 can be selected so that the travel of support portion about axle 18 is restricted to a desired amount. Screw 54 should be long enough to extend beyond the bottom of support portion 12 as shown to enable the above mentioned travel restriction.

Figure 6:
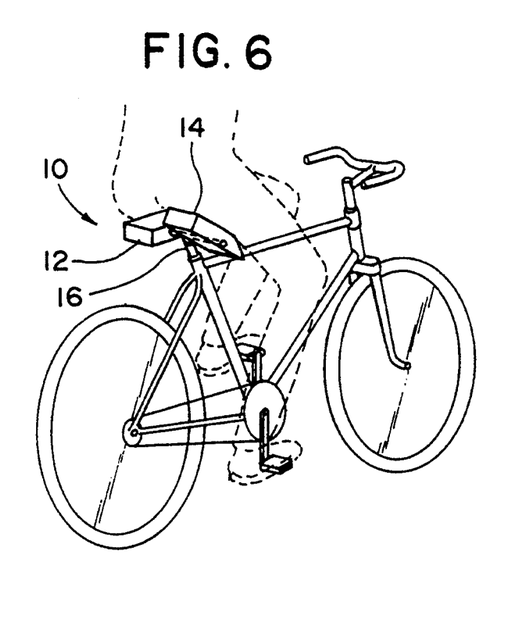
FIG. 6 is a perspective view of the embodiment of FIGS. 1A-3 showing the orientation of a rider and of the seat during a portion of a pedaling cycle.
Figure 7:
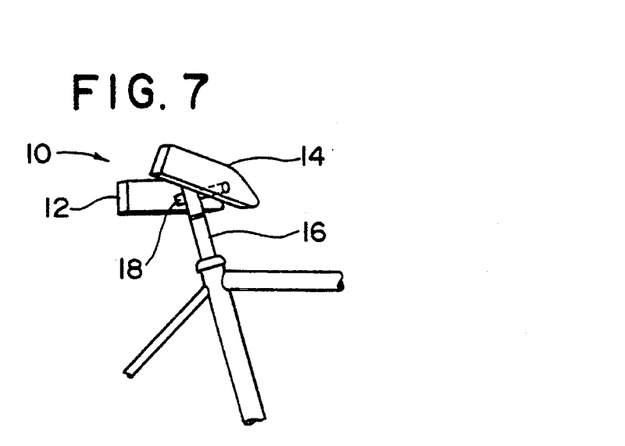
FIG. 7 a side view of the position of the seat of FIGS. 1-3 during the portion of a pedaling cycle shown in FIG. 6.
Figure 8:
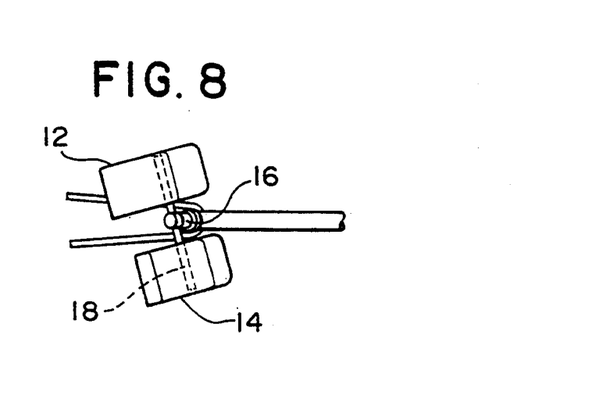
FIG. 8 is a top view of the position of the seat of FIGS. 1-3 during the portion of a pedaling cycle shown in FIG. 6.

The action of the seat assembly 10 of FIGS. 1A–5 is described below with reference to FIGS. 6–8. FIG. 6 shows a body seated on the seat assembly 10 of FIGS. 1A–5 with the right and left pedals at the "twelve o'clock" and "six o'clock" positions, respectively. FIGS. 7 and 8 show the position of the seat from the side and top, respectively, of the same pedal position (the rider has been omitted for clarity). With the pedals in this position, the rider's left leg is fully extended and the right leg is just beginning to exert pressure on the right pedal to push it down. Due to the various pivot points on the seat of the present invention, the left support portion 12 of the seat assembly 10 moves back and down with the left thigh as the left thigh moves back and down, creating very little friction between the leg and the left support portion 12. The support bar 18 moves back toward the rear and center-line of the bike as the seat assembly rotates about the mounting post 16, and the left support portion 12, while moving back towards the rear of the bike with the support bar 18, also rotates about support bar 18 to distribute the pressure of the riders body over the entire surface of left support portion 12. It is at this point that the rider is supporting most of his or her weight on the left leg, and the left support portion 12 of the seat, not being needed for support at this time, moves out of the way of the left leg. This movement eliminates most of the pressure on the rider's legs and buttocks when riding because of the distribution of the pressure; there are no "pressure points" to irritate the rider.

The converse to the above-described motions occurs to the right side of the bike, seat and rider during the same point in time (the twelve and six o'clock positioning). The right support portion 14 is up and forward at this time in the pedaling cycle, and pivots to distribute the weight of the rider's leg and buttocks over the entire surface of right support portion 14.

As is clear from FIGS. 6–8 and the above description, the seat assembly 10 is in a constant state of motion directly related to the motion of the rider during pedaling. The seat assembly 10 operates to move with the rider's legs and buttocks during the pedaling cycle, providing support when needed and moving out of the way when support is not needed. The seat assembly 10 maintains substantially the same points of contact with the buttocks and legs of the rider during the entire pedaling cycle. This movement greatly reduces the amount of friction between the rider and the seat, thereby allowing much greater comfort for the rider.

Figure 9A:
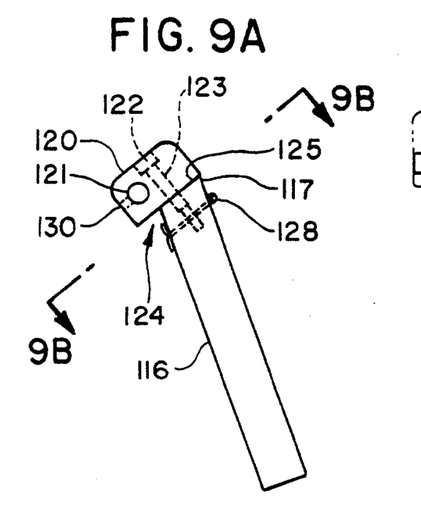
FIG. 9A is a side view of a second embodiment of a seat according to the present invention illustrating an angled mounting post and offset post cap.
Figure 9B:
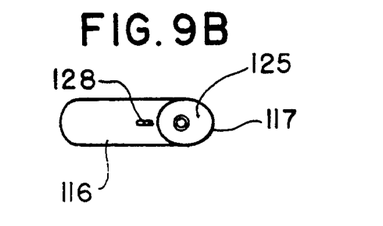
FIG. 9B is a rear view of the mounting means of FIG. 9A.
Figure 10:
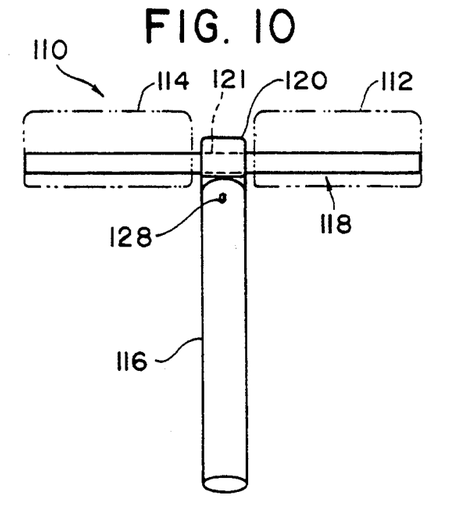
FIG. 10 is front view of the embodiment of FIG. 9.

Another embodiment of the present invention is illustrated in FIGS. 9A and 9B and 10. In this embodiment, the top 117 of mounting means 116 is cut at an angle (for example, a 20 degree angle) so that the two seat halves, while still rotatable about the longitudinal axis of mounting means 116, does so offset at an angle as described below. An "offset" post cap 120 is used to take advantage of the effects of gravity. Offset post cap 120 is longer than the post cap 20 of FIGS. 1A-3 and has a axle mounting hole 121 offset towards the rear of offset post cap 120. Bolt 122 is inserted through post cap mounting hole 123 perpendicular to surface 125 of mounting means 116. Because the top 117 of mounting means 116 is cut at an angle, the surface 125 is elliptical as shown in FIG. 9B. This configuration has the added advantage that the seat assembly 110 will always be oriented in the proper direction when not carrying a rider. Because most of the weight of the seat is towards the rear of the bike, the effects of gravity naturally cause the seat to swivel around so that the front is facing forward and the back is facing backward. When using this configuration, the mounting means 116 should be oriented so that the longest length of mounting means is facing forward as shown in FIG. 6.

Figure 11A:
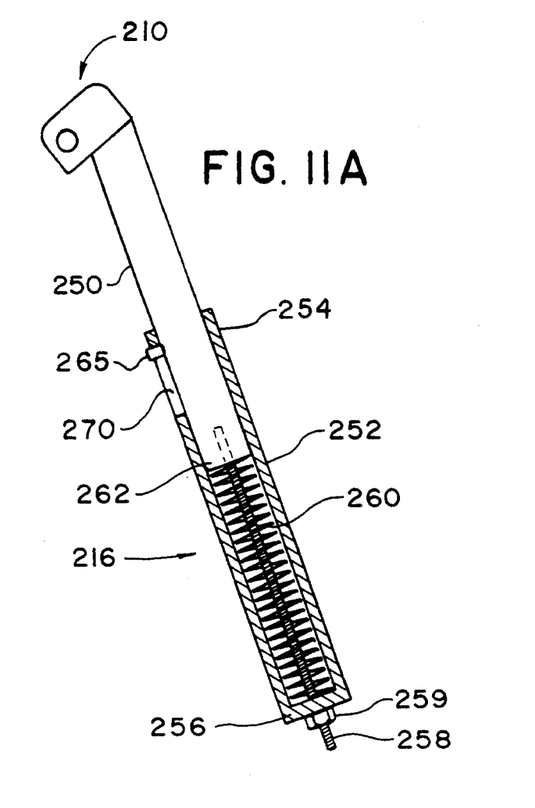
FIG. 11A is a cross-sectional view of a third embodiment of the present invention.
Figure 11B:
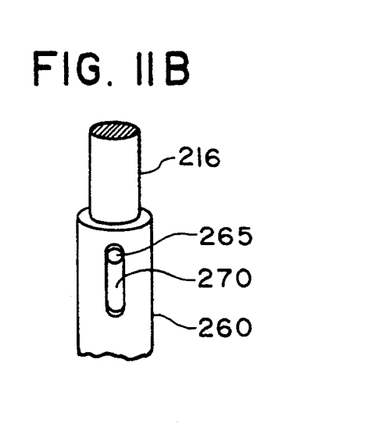
FIG. 11B is a perspective view of the embodiment of FIG. 11A.

FIGS. 11A and 11B illustrate another embodiment of the present invention in which a seat assembly 210 (partially shown) is combined with a spring suspension system to absorb the effect of hitting bumps, stones, et cetera while riding a bicycle equipped with the seat of the present invention. As shown in FIG. 11A, mounting means 216 includes an insertion post 250 inserted into a receiving portion 252 (shown in cross-section). The uppermost end 254 of receiving portion 252 has an opening wide enough to slideably receive insertion post 250 therein. The lowermost end 256 of receiving portion 252 has an opening therein large enough to receive a threaded rod 258 which, in combination with nut 259, is used to loosen or tighten the tension of a spring 260.

Spring 260 is inserted into receiving portion 252, and insertion post 250 is inserted into receiving portion 252, compressing spring 260. Insertion post 250 is threaded at the lower end 262 to threaded rod 258, so that tightening of nut 259 pulls insertion 250 down towards nut 259, thereby compressing spring 260. Nut 259 can be tightened or loosened until a spring tension suitable to the rider is achieved.

Referring to FIG. 11B, to prevent insertion post 250 from rotating around, thereby causing seat assembly 210 to face the wrong direction and also loosening or tightening the tension of spring 260, pin 265 is attached to insertion post 256 by any attaching means, e.g. welding, insertion of a threaded stud into a threaded hole in mounting means 216, et cetera. The pin 265 is inserted into slot 270 in receiving portion 250, thereby preventing rotation of insertion post 250.

Figure 12A:
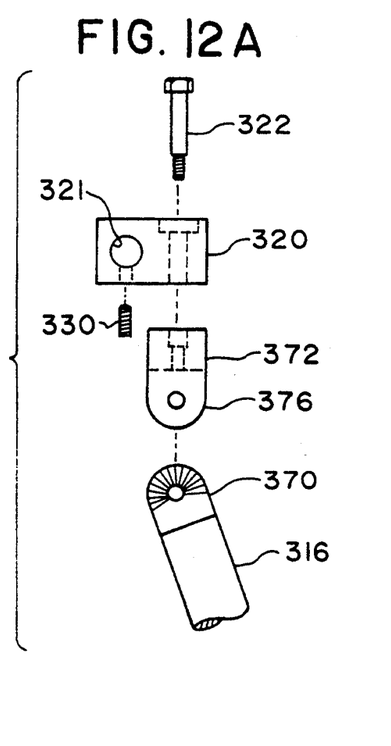
FIG. 12A is an exploded view of another embodiment of the present invention in which the angle of an offset cap relative to the mounting post is adjustable.
Figure 12B:
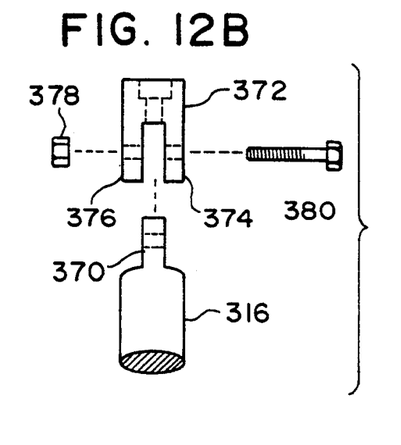
FIG. 12B is a side view of an adjustable pivot portion and mounting post of the embodiment of FIG. 12A.
Figure 12C:
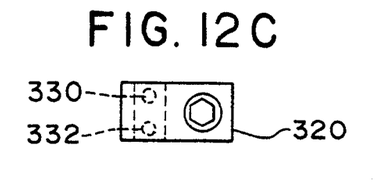
FIG. 12C is a top view of the offset cap of FIGS. 12A and 12B.

FIGS. 12A-12C illustrate another embodiment of the present invention in which the angle of an offset cap present invention relative to the mounting means 316 is adjustable. FIG. 12A is an exploded view of the adjustable offset cap, FIG. 12B is a side view of an adjustable pivot portion and mounting means 316 of FIG. 12A, and FIG. 12C is a top view of the offset cap of FIGS. 12A and 12C.

In FIGS. 12A-12C, flange 370 is attached to or formed on the top of mounting means 316. Adjustable pivot portion 372, having outer flanges 374 and 376, is placed on flange 370 and is tightened thereto using a suitable tightening means, for example, nut 378 and bolt 380 (shown removed). To increase the friction between flange 370 and flanges 374 and 376 and thereby prevent slippage, friction grooves can be included on the surfaces of flanges 370, 374 and 376 that come in contact with each other.

Offset post cap 320 is mounted to adjustable pivot portion 372 using post cap mounting bolt 322. The axle (not shown) is insertable through axle mounting hole 321 as is described above, and is held in place using set screws 330 and 332.

The seat assembly as shown in FIGS. 12A-12C is adjustable by loosening nut 378 and bolt 380, moving the adjustable pivot portion 372 forward or backward to the desired angle, and then re-tightening nut 378 and bolt 380. Such adjustment which alters the up and down movement may be desired because of varying riding conditions or because of personal preference by the rider.

Figure 13A:
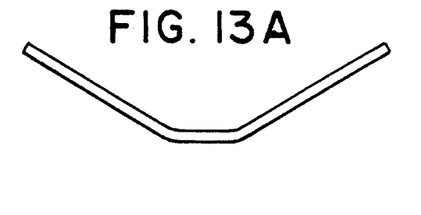
FIGS. 13A–13C are front views of alternative axles.
Figure 13B:
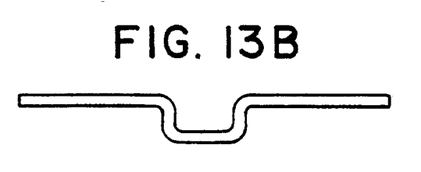
Figure 13C:
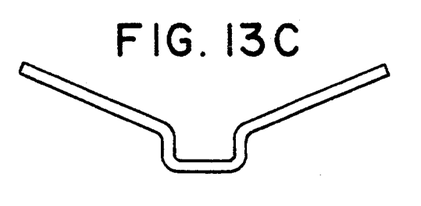
Figure 13D:
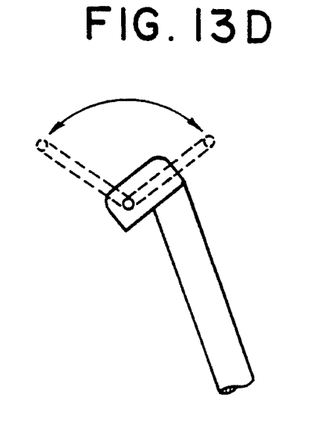
FIG. 13D is a side view of the alternative axles of FIGS. 13A–13C.

Pivot bar 18 (or 118) does not have to be a straight bar. As shown in FIGS. 13A-13C, an angled bar (FIG. 13A), a straight bar with a "U" shaped mounting portion (FIG. 13B), or and angled bar with a "U" shaped mounting portion (FIG. 13C) are all acceptable alternatives to the axle 18 illustrated in FIGS. 1-3. Any of the FIG. 13A-13C axles will serve to raise the seat assembly 10 above the post cap 20, thereby keeping the groin area of the rider away from post cap 20. In addition, by adjusting the position of the axles 13A-13C as shown in FIGS. 13D-13F, respectively, the height of the seat assembly can be adjusted to raise or lower the seat and to move the seat assembly towards the front or back of the bike in accordance with the riders desires. A different post cap is required to enable these adjustments as described below with respect to FIG. 14.

Figure 14A:
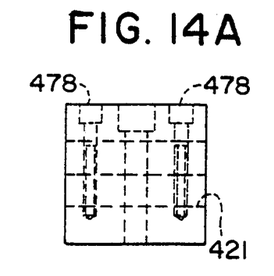
FIGS. 14A–14C are front, side, and top view, respectively, of a post cap having a tension clamp.
Figure 14B:
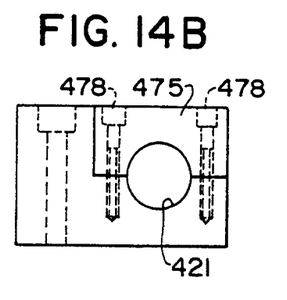
Figure 14C:
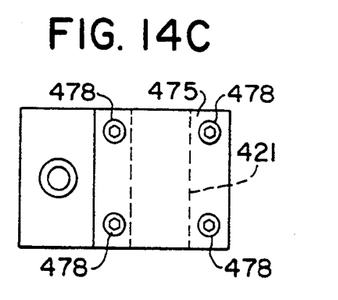

In FIG. 14, a post cap having a tension clamp is illustrated. Post cap 420 has a mounting hole 423 for insertion of bolt 422 to attach the post cap 420 to the mounting means 16 (or 116). Clamping portion 475 is attachable via clamping means 478, for example, bolts, wing nuts on studs, or other clamping device. The desired axle is inserted into axle mounting portion 421 and the clamping portion 475 is tightened using clamping means 478 to hold the axle in the desired position.

Figure 15A:
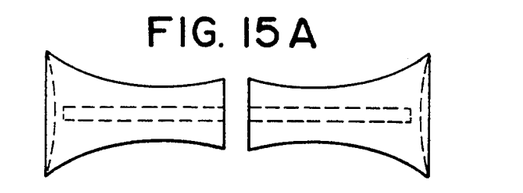
FIGS. 15A–15J are top and side views of alternative support portions according to the present invention.
Figure 15B:
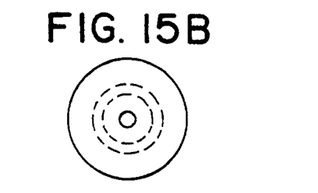
Figure 15C:
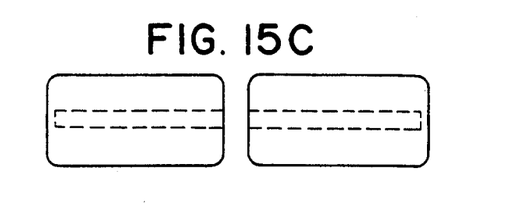
Figure 15D:
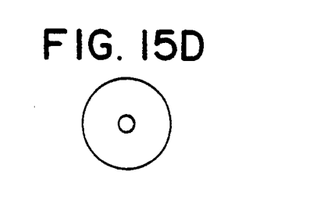
Figure 15E:
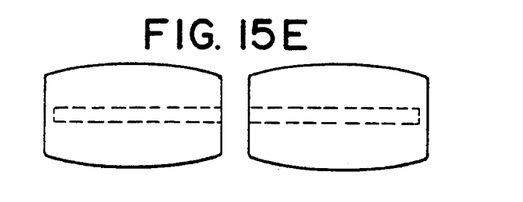
Figure 15F:
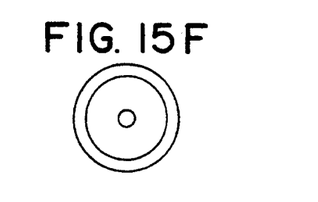
Figure 15G:
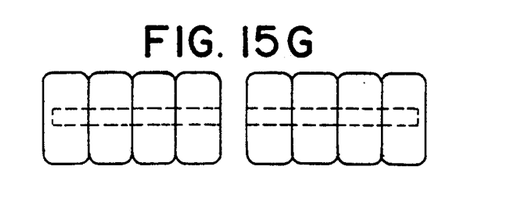
Figure 15H:
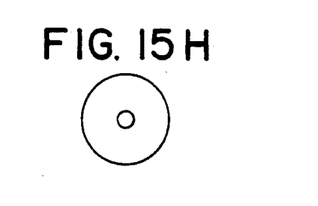
Figure 15I:
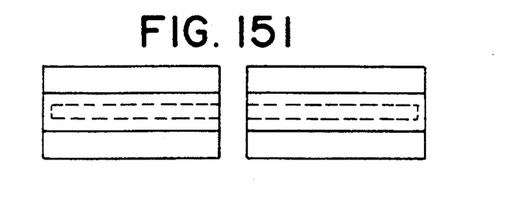
Figure 15J:
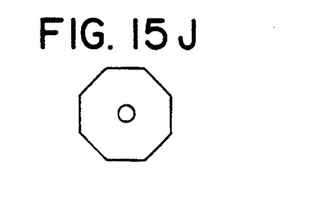

FIG. 15A-15J illustrate various shaped seat halves that can be used as alternatives to the seat halves of FIGS. 4-5. FIGS. 15A and 15B, 15C and 15D, 15E and 15F, and 15I and 15J illustrate front and side views, respectively, of seat halves formed in various shapes. FIGS. 15G and 15H illustrate front and side views, respectively, of seat halves formed of a series of disks mounted on the axle of the present invention. This type of seat has the added advantage that each disc can rotate independently on the axle, thereby reducing friction between the riders legs and the seat.

The present invention allows a rider a greatly enhanced freedom of movement over prior seats, and blends the need for weight support of the rider with the needs of the rider to have as little restriction on movement as possible. It also greatly reduces friction between the rider and the seat. Because the seat moves with and supports the rider at all times, it is not necessary to provide a soft seat surface. With a properly shaped seat that has no high pressure points, a rigid material can be used. This style of seat might include air circulation holes to help keep the rider cool where he or she is in contact with the seat. However, cushioning can be utilized on the seat surface if desired, or the seat could be fluid filled for added comfort. Combination of these are, of course, also possible.

The present invention allows a rider such as a racer to fully use the power of his or her legs to push directly down on the pedal while lifting the other pedal at the same time. A less aggressive rider, for example, a non-racer, will also find the seat comfortable.

The improved vehicle seat of the present invention can be used in any type of vehicle that is propelled by leg action of the rider, or by stationary exercise devices wherein the user of the device exerts a peddling motion.

The foregoing specification has been directed to only a few of the embodiments of this invention. It will be appreciated that various modifications and changes may be made in the foregoing disclosure without departing from the spirit and scope of the invention.

What is claimed is:

1. A seat for a pedal operated device, comprising:
   mounting post means, having a longitudinal axis and a mounting end, for mounting said seat to said pedal operated device, wherein said mounting end of said mounting post means is cut at an angle other than 90 degrees relative to said longitudinal axis of said mounting post means to form an elliptical surface portion;
   post cap means coupled to said mounting end of said mounting post means, for enabling rotation of said post cap means about said longitudinal axis of said mounting post means, said post cap means comprising:
      a post cap, having a post cap mounting hole formed therethrough;
      a post cap mounting bolt insertable through said post cap mounting hole to couple said post cap to said mounting post means so that said post cap can rotate about said longitudinal axis of said mounting post means;
      axle means receiving hole formed through said post cap means; and
      axle means mounting hole formed through said post cap means;
   axle means, having a longitudinal axis and fixedly attached to said post cap means, for enabling rotation of objects mounted on said axle means about said longitudinal axis of said axle means, said axle means comprising;
      an axle, having an axle mounting hole formed therethrough perpendicular to said longitudinal axis of said axle; and
      an axle mounting screw, threadable into said axle means mounting hole of said post cap means, to fixedly attach said axle to said post cap; and
   support means, mounted on said axle means, for supporting a rider of said pedal operated device, and wherein said post cap mounting bolt is coupled to said mounting post means perpendicularly to said elliptical surface portion.

2. A seat for a pedal operated device, comprising:
   mounting post means, having a longitudinal axis and a mounting end, for mounting said seat to said pedal operated device, said mounting post means including:
      a receiving portion having a tightening rod hole at one end and an insertion post receiving hole at the other end;
      a spring insertable into said receiving portion via said insertion post receiving hole;
      an insertion post connectable to said post cap means at one end and having a threaded tensioning rod receiving hole at the other end;
      a tensioning rod having two ends, the first end being insertable through said tensioning rod hole and threadable into said threaded tensioning rod receiving hole; and
   a tensioning rod nut, threadable onto said second end of said tensioning rod, to enable tightening or loosening of said spring;
   post cap means, coupled to said mounting end of said mounting post means, for enabling rotation of said post cap means about said longitudinal axis of said mounting post means, said post cap means including:
      a post cap, having a post cap mounting hole formed therethrough; and
      a post cap mounting bolt, insertable through said post cap mounting hole, to couple said post cap to said mounting post means so that said post cap can rotate about said longitudinal axis of said mounting post means;
   axle means, having a longitudinal axis and fixedly attached to said post cap means, for enabling rotation of objects mounted on said axle means about said longitudinal axis of said axle means; and
   support means, mounted on said axle means, for supporting a rider of said pedal operated device.

3. A seat as recited in claim 2, wherein said receiving portion of said mounting post means includes a slot parallel to the longitudinal axis of said mounting post means and wherein said insertion post includes an orientation pin passing through said slot to inhibit rotation of said insertion post about the longitudinal axis of said mounting post means.

* * * * *